United States Patent
Melo et al.

(10) Patent No.: US 6,431,772 B1
(45) Date of Patent: Aug. 13, 2002

(54) BROADCAST PRINTING SYSTEM AND METHOD

(75) Inventors: William Melo, Simi Valley; Ladon Harrison, Moorpark; Maxim Sorkin, Canoga Park; Tiberiu Dumitrescu, Simi Valley; Alistair Egan, Oxnard, all of CA (US)

(73) Assignee: Hitachi Koki Imaging Solutions, Inc., Simi Valley, CA (US)

( * ) Notice: Subject to any disclaimer, the term of this patent is extended or adjusted under 35 U.S.C. 154(b) by 0 days.

(21) Appl. No.: 09/558,667

(22) Filed: Apr. 26, 2000

(51) Int. Cl.[7] .................................................. B41J 3/42
(52) U.S. Cl. .............................. 400/70; 61/62; 61/76; 709/217; 709/218; 358/1.15
(58) Field of Search ........................... 400/719, 61, 62, 400/67, 70, 71, 76, 77; 358/1.13–1.16; 709/217, 218

(56) References Cited

U.S. PATENT DOCUMENTS 5,956,487 A  9/1999  Venkatraman et al. ...... 709/218
5,956,698 A  9/1999  Lacheze et al. ............... 705/34
5,987,226 A  11/1999  Ishikawa ...................... 395/112

FOREIGN PATENT DOCUMENTS

EP  0886206 A2  5/1998

*Primary Examiner*—Andrew H. Hirshfeld
*Assistant Examiner*—Minh H. Chau
(74) *Attorney, Agent, or Firm*—Pillsbury Winthrop LLP

(57) ABSTRACT

A broadcast printing system includes a first data communication network including a client device and one or more local imaging devices. A remote imaging device is coupled to the first data communication network through a second data communication network. In response to a single print request generated by an application process hosted on the client device, a print job is transmitted to the local imaging device according to a local print protocol and a print job is transmitted to the remote imaging device according to a protocol suitable for transmitting print jobs in a public data communication network such as the Internet Printing Protocol.

23 Claims, 2 Drawing Sheets

BROADCAST PRINTING SYSTEM AND METHOD

BACKGROUND

1. Field of the Invention

The present invention relates to a system and method for printing of documents on a plurality of devices in a network.

2. Description of the Related Art

A typical private data communication network such as a local area network (LAN) or a wide area network (WAN) may include one or more workstation computer and a network server computer. The private data communication network may also include one or more local imaging devices which receive print jobs from the workstation computers. The private data communication network may implement an intranet network using an Internet Protocol (IP) for transmission of data between devices in the private data communication network. When a user desires to print from the workstation computer to the local imaging devices, the user initiate a print request from the workstation computer. In response to the print request, a print driver hosted on the workstation computer may initiate the transmission of a print job to a local printer.

In some systems, the printer driver may initiate the transmission of separate print jobs to more than one of the local printers in the private data communication network. Although each of the local printers need not be identical devices (i.e., the same brand and model of printer), each of the local printers must typically be "like" devices that are within the same printer or printer/copier family. Each print job that is received at each local printer is typically queued into the local printers and printed from a queue accordingly.

The print jobs sent to the local printers may utilize the standard line printer daemon (LPD) protocol supported by the Internet Protocol (IP). However, other network printing protocols such as the Novell NDPS protocol are also typically used. Local printing protocols, such as the LPD protocol, are limited to transmitting print jobs to only those destinations in the Intranet network.

Additionally, these local printing protocols are typically limited for use among only "like" printers, that is, printers within the same family.

SUMMARY

An embodiment of the present invention relates to a system and method for transmitting a print job from a process hosted on a client device in a first communication network to a plurality of devices using a single print request issued by the process. At least one of the devices is a local imaging device coupled as a node on the first communication network and at least one of the devices is a remote imaging device coupled to the first data communication network through a second communication network.

DETAILED DESCRIPTION

Figure 1:
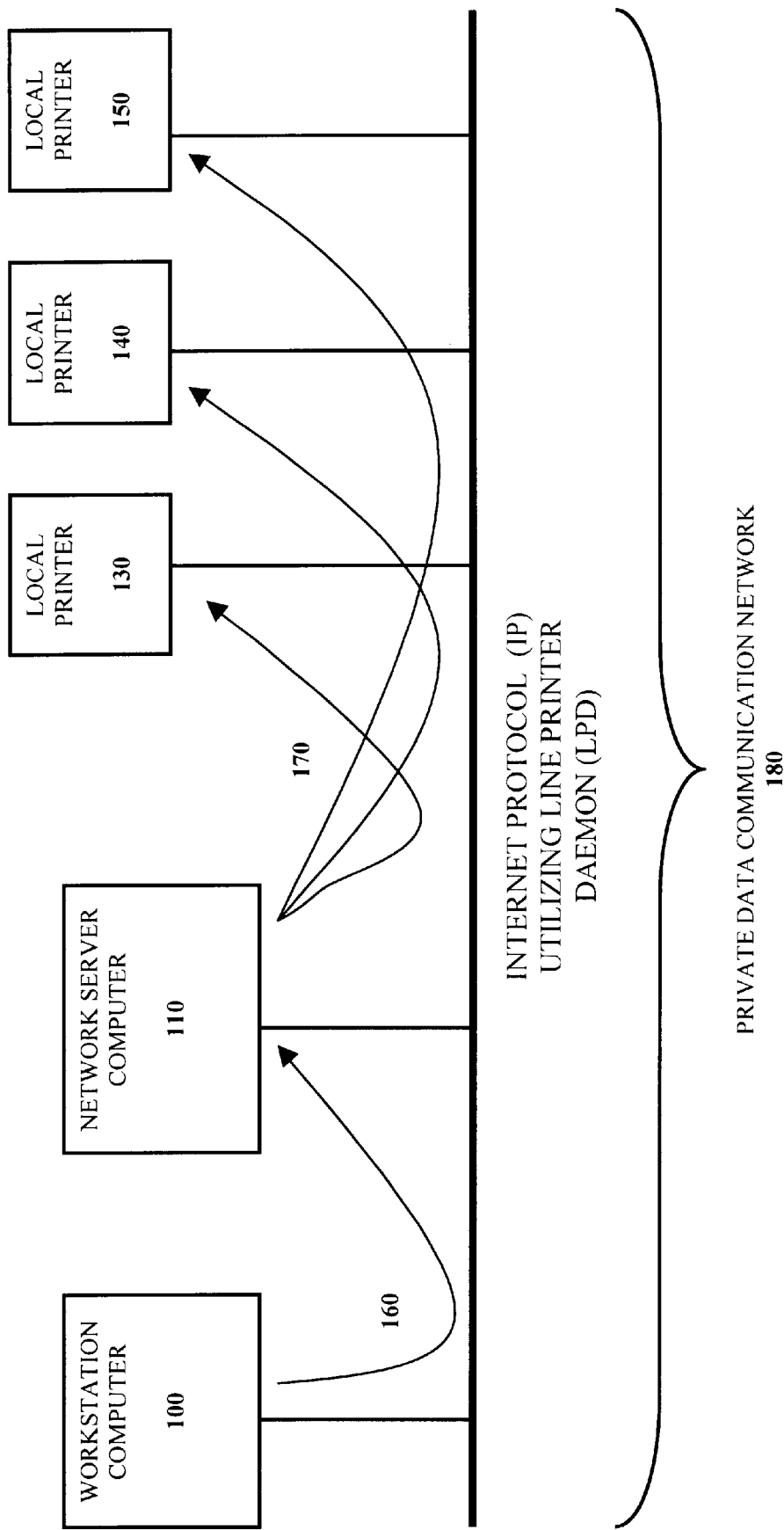
FIG. 1 illustrates a first network printing system.

FIG. 1 illustrates a network printing system. A typical workstation computer 100 and network server computer 110 are included in a private data communication network 180. More than one workstation computer may be included in the private data communication network 180. Local printers 130, 140 and 150 may also be included in the private data communication network 180. The private data communication network 180 may support an Internet Protocol (IP) for the transmission of data between the attached devices to provide an intranet. When a user desires to print from the workstation computer 100 to any of the local printers 130, 140 and 150, a software driver at the workstation computer 100 responds to a print request 160 for initiating the transmission of a print job to the network server computer 110.

A workstation computer 100 may host a software driver which initiates a transmission of a print job 160 to one or more of the local printers 130,140 and 150. Once the network server computer 110 receives the print job 160, the network server computer 110 may issue separate print jobs 170 to each of the local printers 130, 140 and 150. Each print job 170 that is sent to each local printer 130, 140 and 150 may be enqueued at the local printers 130, 140 and 150 and printed accordingly.

The print jobs 170 sent to the local printers 130, 140 and 150 may utilize the standard line printer daemon (LPD) protocol supported by the Internet Protocol (IP) and in the private network 180. However, other printing protocols such as the Novell NDPS protocol, may be utilized.

Figure 2:
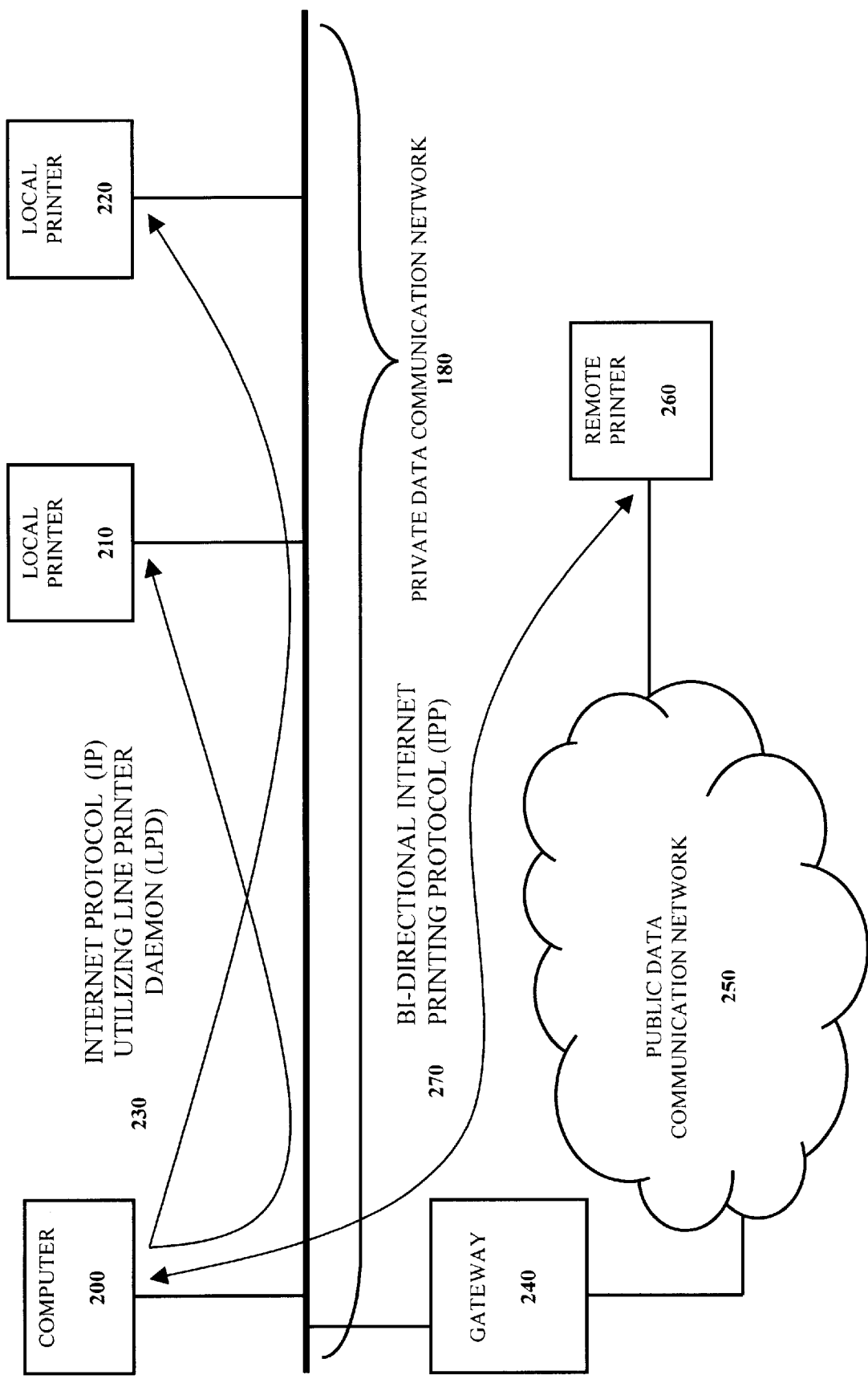
FIG. 2 illustrates a cluster printing system.

FIG. 2 illustrates a cluster printing system according to an embodiment of the present invention. A printing system may include a public data communication network 250 such as the Internet, a private communication network 180 having a connection to the public data communication network 250 and including a computer 200 and local printers 210 and 220. A remote printer 260 is coupled to the private data communication network 180 through the public data communication network 250. In other embodiments, the public communication network 250 may take forms other than the Internet and the private communication network 180 may take forms other than that of an Intranet.

In the illustrated embodiment, devices coupled to the private data communication network 180 may communicate with devices outside of the private data communication network 180 through a gateway 240 which includes a firewall (not shown). The private data communication network 180 may employ one or more communication mediums including twisted pair lines, coaxial cable or wireless communication links.

The computer 200 has sufficient CPU and memory resources to support an operating system (such as versions of Windows) utilities, device drivers and applications. The device drivers may include a network driver to enable communication with other devices on the private data communication network 180 or with devices on the public data communication network 250. The device drivers may also include a print driver which is capable of transmitting print jobs to either of the local printers 210 or 220, or the remote printer 260. The applications may also include typical office applications (such as word processors or spreadsheets) which create printable documents. From one of these applications, the user may issue a request (e.g., by clicking on an icon or button with a pointer device in a graphical user interface) to have a document printed on a printer.

Such a request initiates the printer driver to create a print job to be transmitted to one or more of the printers 210, 220 and 260. Also, the printer driver may transmit a print job to one or more of the local printers 210 and 220, and a print job to the remote printer 260 in response to a single print request at an application. Accordingly, the printer driver is capable of formatting print jobs which are interpretable by any of the printers 210, 220 and 260. Here, from only the single print request, the printer driver transmits separate print jobs to each one of the at least one local printer 210 and 220, and the remote printer 260. The separate print jobs 230 and 270 are transmitted via a local printing protocol 230 to at least one of the local printers 210 and 220, and via an internet printing protocol 270 to the at least one remote printer 260.

In the illustrated embodiment, the printer driver is not limited to formatting multiple print jobs for printers and printer/copiers that are "like" devices or within the same "family". That is, different types, brands, and models of printers and printer/copiers may be included in the private data communication network 180 or the internet network 250, and the printer driver is adapted to generate print jobs 230 and 270 in the appropriate formats for each destination printer because the printer driver is pre-configured to print to the designated printers 210, 220 and 260.

Since the printer driver creates each print job for a destination printer in a format interpretable by the destination printer, the different destination printers may be significantly dissimilar provided that each destination printer to receive a print job from a single print request meets minimal system requirements for fulfilling the print request (e.g., sufficient availability of features such as stapling and collating).

In the embodiment illustrated in FIG. 2, the printer driver resides on the workstation 200 such that the printer driver directly responds to print requests at an application to generate multiple print jobs. In other embodiments, a printer driver may reside on a print server (not shown) in the private data communication network 180 on a device which is distinct from the workstation 200. In this embodiment, an application at the workstation 200 may provide a single print request to a print driver at the workstation 200. The print driver at the workstation 200 transmits a single print job to the print server, and the print server may then create and transmit multiple print jobs to at least one of the local printers 210 and 220, in addition to the remote printer 260.

In this embodiment, the print driver at the workstation 200 may indicate one or more destination printers in the single print job transmitted to the print server. For each destination printer, the print server may then create a print job for each destination printer in a format interpretable by the destination printer. The formatted print jobs may than be forwarded to the destination printers. Like in the network printing system of FIG. 1, the local printing protocol 230 may utilize the standard line printer daemon (LPD) protocol, or any other suitable local printing protocol, to transmit the print jobs 230 to the local printers 210 and 220 in the private data communication network 180. Local printing protocols have a limitation in that they are not adapted to transmit print jobs to locations outside of the private networks.

A printing protocol 270, such as the Internet Printing Protocol (IPP 1.0), described in Internet Printing Protocol/ 1.1: Model and Semantics and Internet Printing Protocol/ 1.1: Encoding and Transport, published by the Printer Working Group of the Internet Engineering Task Force (IETF) on Mar. 1, 2000, allows an end user to remotely print to any IPP-enabled print through the public data communication network 250. The advantage of using the printing protocol 270 is that it provides the opportunity to transmit digital document print jobs anywhere in the world to printers coupled to the Internet without the long distance charges that a facsimile transmission can incur. Moreover, IPP also provides the option to electronically distribute "original" documents, such as newsletters, contacts, etc. to others (including professional "print shops", document companies, etc.) for printing via an Internet network. For example, a small business may use the IPP to transfer print data to a commercial print shop. The small business could set up an account with a commercial print shop having expensive equipment such as color laser printers or wide-format printers. So, whenever the small business needs to print documents on the print shop's printing equipment, the print job may be transmitted through the Internet to be directly printed at the commercial print shop in the appropriate format.

The Internet printing protocol 270 may be bi-directional, allowing for communication between the printer and the client process transmitting print jobs to the printer. For example, the user can issue print jobs, inquire about a printer's capabilities, inquire about the status of a printer and the status of a print job, as well as remotely issue other printing commands such as canceling a print job.

The implementation of the Internet Printing Protocol (IPP) is based on two basic object types: (1) a printer object; and (2) a job object. The IPP model defines the attributes and operations for the printer object and the job object. An object's attributes describe its function(s), state, and default characteristics. An object's operations describe what can be requested of the object. The IPP run-time flow involves requests and responses. The request can be, for example, to print a document, or it can be a Uniform Resource Identifier (URI) request (for retrieving a document from a location on the Internet). The IPP response provides information on whether the request may be performed (e.g., is the correct version of the protocol in use by both the user and the printer). IPP is supported by the Hypertext Transfer Protocol (HTTP) for its transmissions across the Internet. Therefore, unlike local printer protocols, such as the line printer daemon (LPD) protocol, the internet printing protocol 270 is capable of transmitting a print job 270 directly from the computer 200, through the firewall in the internet gateway 240 and across the public data communication network 250 to a remote printer 260. The computer 200 and the gateway 240 may be embodied within the same computer system platform.

The remote printer 260 may be an IPP-enabled printer having an assigned URI "address" so that properly formatted print jobs may be sent directly to the printer's address and printed at the remote printer 260.

In the illustrated embodiments, a single print request from an application hosted on the workstation 200 may cause multiple print jobs to be transmitted to different printers. The printer driver may be configured to transmit print jobs to printers on the private data communication network 180 using the LPD protocol and transmit print jobs to printers through the public data communication network 250 using the IPP in response to the single print request. Alternatively, a print server may be configured to transmit print jobs to printers on the intranet network 180 using the LPD and transmit print jobs to printers through the public data communication network 250 using the IPP in response to receipt of a single print job from the workstation 200.

In an alternative embodiment, the computer workstation 100, remote printer 260, and local printers 210 and 220 are in a private Intranet. The computer workstation 100 and local printers 210 and 220 may be nodes in a first network which provides communication among devices according to a media access control (MAC) protocol. The remote printer 260 is in a second network which is distinct from the first network. A server (not shown) couples the first network to the second network such that devices in the first network may address devices in the second network are addressable according to an Internet Protocol. Accordingly, as illustrated above with reference to FIG. 2, the computer workstation 100 can transmit a print job to the remote printer 260 on the second network according to the IPP and a print job to at least one of the local printers 210 and 220 on the first network in response to a single print request.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A network printing system comprising:
    a public data communication network;
    a private data communication network coupled to the public data communication network at a gateway, the private data communication network including at least one local imaging device for transferring images to media and a client device for hosting processes for requesting the printing of a document; and
    at least one remote imaging device for transferring images to media coupled to the private data communication network through the public data communication network,
    logic for transmitting a print job to at least one local imaging device and a print job to the remote imaging device in response to a single print request at the client device.

2. The network printing system according to claim 1, wherein the client device hosts an application process for generating print requests and a print driver having logic for transmitting a print job to at least one local imaging device and the remote imaging device in response to a single print request generated by the application process.

3. The network printing system according to claim 1, wherein the private data communication network further includes a print server and the client device hosts an application process for generating print requests, wherein client device further includes logic for transmitting a print job to the print server in response to a single print request from the application process and wherein the print server includes logic for transmitting a print job to at least one local imaging device and a print job to the remote imaging device in response to receipt of the print job from the a single print request generated by the application process.

4. The network printing system according to claim 1, wherein at least a portion of the public data communication network includes the Internet and the gateway includes a firewall for monitoring data transmitted between the Internet and the private data communication network further includes logic for transmitting the print job to the remote imaging device according to the Internet Printing Protocol.

5. The network printing system of claim 4, wherein the cluster printing system according to claim 1, wherein the private communication network includes logic for transmitting the at least one print job to the local imaging device according to the line printer daemon (LPD) protocol.

6. The network printing system according to claim 1, wherein the printing system further includes logic for transmitting the print job to the remote imaging device according to a protocol permitting bi-directional communication between the remote imaging device and the private data communication network.

7. A method of printing documents, the method comprising:
    receiving a single print request at a client device in a private data communication network for printing a document;
    in response to receipt of the single print request, transmitting a print job to at least one local imaging device for transferring images to media in the private data communication network and transmitting a print job to a remote imaging device for transferring images to media coupled to the private data communication network through a public data communication network, the public data communication network being coupled to the private communication network at a gateway.

8. The method of claim 7, the method further including:
    generating the single print request at an application process hosted on the client device; and
    receiving the single print request at a print driver hosted on the client device; and
    transmitting the print jobs to the local imaging device and to the remote imaging device from the client device in response to receipt of the single print request at the print driver.

9. The method of claim 7, the method further including:
    generating the single print request at an application process hosted on the client device; and
    transmitting a single print job from the client device to a print server hosted on a device in the private network which is distinct from the client device in response to the single print request; and
    transmitting the print jobs to the local imaging device and to the remote imaging device from the print server in response to receipt of the single print job at the print server.

10. The method of claim 7, wherein at least a portion of the public data communication network includes the Internet and the gateway includes a firewall for monitoring data transmitted between the Internet and the Private data communication network, the method further including transmitting the print job to the remote imaging device according to the Internet Printing Protocol in response to receipt of the single print request.

11. The method of claim 7, the method further including transmitting the print job to the at least one local imaging device according to the line printer daemon protocol.

12. The method of claim 7, the method further including transmitting the print job to the remote imaging device according to a protocol permitting bi-directional communication between the remote imaging device and the private data communication network.

13. A computer readable medium having computer readable instructions encoded thereon for:
    receiving a single print request for printing a document from an application process hosted on a client device in a private data communication network;
    in response to receipt of the single print request, transmitting a print job to at least one local imaging device for transferring images to media in the private data communication network and transmitting a print job to a remote imaging device for transferring images to media coupled to the private data communication network through a public data communication network.

14. The computer readable medium of claim 13, the computer readable medium further including computer readable instructions encoded thereon for transmitting the print job to the remote imaging device according to the Internet Printing Protocol in response to receipt of the single print request.

15. The computer readable medium of claim 13, the computer readable medium further including computer readable instructions encoded thereon for transmitting the print job to the at least one local imaging device according to the line printer daemon protocol.

16. A computer readable medium having computer readable instructions encoded thereon for:
   receiving a single print job from a process hosted on a client device in a private data communication network;
   in response to receipt of the single print job, transmitting a print job to at least one local imaging device for transferring images to media on the private data communication network and transmitting a print job to a remote imaging device for transferring images to media coupled to the private data communication network through a public data communication network.

17. The computer readable medium of claim 16, wherein the computer readable medium further includes computer readable instructions encoded thereon for transmitting the print job to the least one local imaging device according to the line printer daemon protocol.

18. The computer readable medium of claim 16, wherein a portion of the public data communication network includes the Internet and the computer readable medium further includes computer readable instructions encoded thereon for transmitting the print job to the remote imaging device according to the Internet Printing Protocol.

19. A network printing system comprising:
   a first data communication network for transmitting data among a client device for hosting processes for requesting the printing of a document and at least one local imaging device for transferring images to media according to a first media access control (MAC) protocol;
   a second data communication network, the second data communication network including at least one remote imaging device for transferring images to media, for transmitting data among devices which are not directly addressable from devices on the first network according to the first MAC protocol,
   wherein the first network includes logic for transmitting a print job to at least one local imaging device and a print job to the remote imaging device in response to a single print request at the client device.

20. The network printing system of claim 19, the network printing system further including a processor coupled to the first and second networks for transmitting data from devices in the first network to devices on the second network according to an Internet Protocol.

21. The network printing system of claim 20, wherein logic for transmitting a print job transmits the print job to the remote imaging device according to an Internet Printing Protocol.

22. The network printing system of claim 19, wherein the logic for transmitting a print job to at least one local imaging device and a print job to the remote imaging device is implemented in software hosted on the client device.

23. The network printing system of claim 19, wherein first network includes a print server distinct from the client device, and wherein the logic for transmitting a print job to at least one local imaging device and a print job to the remote imaging device resides at the print server.

* * * * *